United States Patent
Nakagawa et al.

[11] Patent Number: 5,939,840
[45] Date of Patent: Aug. 17, 1999

[54] LIQUID CRYSTAL BACK LIGHT ILLUMINATING DEVICE AND LIQUID CRYSTAL DISPLAY DEVICE

[75] Inventors: Eiji Nakagawa; Sachito Horiuchi, both of Ukyo-ku, Japan

[73] Assignee: Rohm Co., Ltd., Kyoto, Japan

[21] Appl. No.: 09/059,199

[22] Filed: Apr. 14, 1998

[30] Foreign Application Priority Data

Apr. 15, 1997 [JP] Japan .................................. 9-113365

[51] Int. Cl.⁶ ................................................ G05F 1/00
[52] U.S. Cl. .................... 315/307; 315/224; 315/DIG. 5; 315/276
[58] Field of Search .................................. 315/224, 276, 315/307, 274, 258, 263, 291, DIG. 5

[56] References Cited

U.S. PATENT DOCUMENTS

| | | | |
|---|---|---|---|
| 4,585,974 | 4/1986 | Stupp et al. | 315/224 |
| 5,404,082 | 4/1995 | Hernandez et al. | 315/291 |
| 5,485,061 | 1/1996 | Ukita et al. | 315/307 |
| 5,621,281 | 4/1997 | Kawabata et al. | 315/224 |
| 5,629,588 | 5/1997 | Oda et al. | 315/307 |
| 5,726,536 | 3/1998 | Hagiwara | 315/276 |

*Primary Examiner*—Don Wong
*Assistant Examiner*—Wilson Lee
*Attorney, Agent, or Firm*—Fay, Sharpe, Beall, Fagan, Minnich & McKee

[57] ABSTRACT

A liquid crystal back light illuminating device includes a driving circuit which receives a first value voltage at light-on starting. The device drives a voltage stepping up circuit and lights on a cold cathode tube with a stepped-up high voltage. Thereafter, it receives a second value voltage, drives the voltage stepping up circuit and continues the lighting-on of the cold cathode tube with a lower stepped-up voltage than the former stepped-up high voltage. A slowly varying voltage which is obtained by charging a capacitor with a small current is applied to the driving circuit via an amplifier and a switch circuit. When the varying output voltage comes close to the second value voltage beyond a predetermined value, the switch circuit switches to the second value voltage. Thereby, flickering of the cold cathode tube at the time of switching the light-on condition is prevented.

10 Claims, 3 Drawing Sheets

LIQUID CRYSTAL BACK LIGHT ILLUMINATING DEVICE AND LIQUID CRYSTAL DISPLAY DEVICE

BACKGROUND OF THE INVENTION

1. Field of the Invention

The present invention relates to a liquid crystal back light illuminating device and a liquid crystal display device and, more specifically, to a liquid crystal back light illuminating device which prevents flickering of display at the start of the display via the liquid crystal in a driving circuit of a cold cathode tube which is used as a back light for a liquid crystal display device, and is suitable for reducing the size of the device.

2. Background Art

Conventional back lights, which are disposed at the back side of a liquid crystal member, generally use a cold cathode tube. A light-on voltage of a cold cathode tube is very high about 1,200 V at the time of start and even during a steady light-on state (stable state) the voltage is comparatively high of about 200 V –300 V. These high voltages are obtained by stepping up a voltage of about 5 V–6 V. For this purpose, an inverter circuit is used for a light-on circuit for such cold cathode tube, and further, due to recent demand of circuit size reduction an inverter circuit making use of a piezo electric transformer is currently being used instead of an electro magnetic type inverter circuit.

FIG. 5 is such a cold cathode tube illuminating device making use of a piezo electric transformer.

Numeral 10 generally designates the cold cathode tube illuminating device and numeral 1 is a control circuit therefor, 5 is a piezo electric transformer driving circuit therefor, 6 is a piezo electric transformer and 7 is a cold cathode tube, in that a cold cathode fluorescent lamp. The control circuit 1 is constituted by a pulse oscillation circuit 2, a flip-flop circuit (FF) 3 and buffer amplifiers 4a and 4b which receive outputs from the flip-flop circuit 3. A Q output and an inverted side output ($\overline{Q}$ output, hereinbelow called as Q bar output) generated with the Q output of the flip-flop circuit (FF) 3 are respectively applied via the buffer amplifiers 4a and 4b to the piezo electric transformer driving circuit 5. Further, the pulse oscillation circuit 2 is an oscillation circuit of which oscillation frequency at a steady light-on state is automatically controlled, and is constituted by such as a differential amplifier 21, a reference voltage generating circuit 22, a starter circuit 23 and a V/F converting circuit (V/F) 24 which receives an output voltage from the differential amplifier 21 and converts the same into a pulse signal having a predetermined frequency corresponding to the value of the received voltage.

A discharge current of the cold cathode tube 7 at the time of light-on is detected by a resistor R in a form of voltage value of which the differential amplifier 21 receives at its inverted input (−input) via a terminal 1a. The differential amplifier 21 also receives a reference voltage Vr from the reference voltage generating circuit 22 at its positive input (+input) via a terminal 1b. The reference voltage generating circuit 22 is a divider circuit constituted by a variable resistor R1 and a resistor R2 dividing a voltage of a power source line VDD. The above mentioned reference voltage Vr is one of the divided voltages. Normally, the reference voltage generating circuit 22, in particular, its variable resistor R1 is an externally added circuit with respect to the IC formed control circuit 1 for performing a brightness adjustment of the back light.

With this structure, after the lighting-on of the cold cathode tube 7 the variable resistor R1 is adjusted and the V/F 24 is controlled by the differential amplifier 21 so as to generate a pulse signal having a predetermined frequency which causes the voltage at the resistor R representing the discharge current through the cold cathode tube 7 during light-on thereof to coincide with the reference voltage Vr. As a result, the piezo electric transformer driving circuit 5 is driven with the pulse signal having the predetermined frequency. In the FIG. 5 conventional circuit, since the flip-flop circuit 3 is provided, the actual driving frequency is divided into ½ of the generated frequency.

The starter circuit 23 is a circuit which temporarily sets the reference voltage high by turning ON a switch SW (or a switching circuit, the same is true hereinbelow) for a predetermined time interval so as to generate a high voltage at the cold cathode tube 7 during the starting up thereof. With this arrangement, a driving signal having a high frequency is generated during the starting up period and a high stepped up voltage more than 1,000 V is obtained. The switch SW is caused to be turned ON for a predetermined interval in response to a control signal from a controller 8.

Now, in the above explained cold cathode tube light-on circuit the drive frequency for driving the piezo electric transformer is determined through setting the frequency of a pulse oscillation circuit in the piezo electric transformer driving circuit (a stepping-up circuit driving circuit) 5. In order to achieve an inherent performance of the piezo electric transformer and to drive the same at a high efficiency in connection with a tube current in the cold cathode tube the driving frequency of the piezo electric transformer is set, for example, at 73 kHz–74 kHz during the light-on period and at 69 kHz during a stable period after the light-on period.

The piezo electric transformer driving circuit 5 is constituted by a first switching circuit 51 and a second switching circuit 52 both are provided between a power source line $V_{DD}$ and a grounding line GND. The first switching circuit 51 is constituted by a series circuit including a coil L1 provided at the side of the power source $V_{DD}$ and an N channel MOSFET transistor Q1 of which drain side is connected to the coil L1 and of which source side is grounded. An output P1 of the transistor Q1 appears at the juncture between the drain of the transistor Q1 and the coil L1 and is connected to a primary side electrode 61 of the piezo electric transformer 6. The gate of the transistor Q1 is connected to receive the Q bar output of the flip-flop circuit 3 via the buffer amplifier 4a.

The second switching circuit 52 is constituted by another series circuit including a coil L2 provided at the side of the power source $V_{DD}$ and an N channel MOSFET transistor Q2 of which drain side is connected to the coil L2 and of which source side is grounded. An output P2 of the transistor Q2 appears at the juncture between the drain of the transistor Q2 and the coil L2 and is connected to a primary side electrode 62 of the piezo electric transformer 6. The gate of the transistor Q2 is connected to receive the Q output of the flip-flop circuit 3 via the buffer amplifier 4b.

In the above explained circuit the coils L1 and L2 are inserted in series with the piezo electric transformer 6. The reason of employing such circuit structure is to efficiently utilize a voltage oscillation by the piezo electric transformer 6 determined depending on the capacitive component of the piezo electric transformer 6 and the inductance component of the coils. Accordingly, the inductance values of the coils L1 and L2 are respectively selected in view of the capacitive component of the piezo electric transformer 6 so as to resonate with the frequency of the driving signal, thereby the conversion efficiency of the circuit is increased.

The cold cathode tube 7 is connected through one electrode thereof to a secondary side electrode 63 of the piezo electric transformer 6 and the other electrode thereof is connected to the ground GND via a parallel circuit of a resistor R and a diode D.

Since the cold cathode tube 7 is used as the back light for a liquid crystal display, the brightness during the steady light-on state with the cold cathode tube lighting-on circuit is suppressed low. However, if the cold cathode tube 7 is lighted on at a low brightness state from the start, the brightness unstabilizes and flickering is likely induced, therefore, the cold cathode tube 7 is generally lighted on at a high brightness temporarily during the start up and after the complete lighting-on the brightness is dropped to a target value.

The above explained starter circuit 23 is provided for this purpose. However, the starter circuit 32 is required to drop the high voltage momentarily to the adjusted reference voltage Vr which causes a momentary flickering.

Such a flickering is frequently caused, in particular, in a note type personal computer having a keen demand of size reduction. This is because a liquid crystal display screen of such note type personal computer is frequently lighted off under a predetermined condition and lighted on again in order to suppress the electric power consumption thereby. As a result, the flickering at the time of lighting-on is noticeable and such is also undesirable for human eyes.

For counter measuring the above problem it is conceived to perform the switching slowly from the high voltage during the starting up to the adjusted reference voltage Vr, however the switching with a time constant at which human eyes feel no flickering requires an externally added capacitor having a large capacity, which is problematic with regard to the mounting thereof for a thin and small size electronic equipment such as a note type personal computer.

SUMMARY OF THE INVENTION

An object of the present invention is to resolve the above explained problems in the conventional art, and to provide a liquid crystal back light illuminating device which prevents flickering of display at the start-up of the display via the liquid crystal and is suitable for reducing the size of the device.

Another object of the present invention is to provide a liquid crystal display device which prevents flickering of display at the start-up of the display via the liquid crystal.

The liquid crystal back light illuminating device and the liquid crystal display device according to the present invention which achieve the above objects, is characterized, in that the liquid crystal back light illuminating device comprising a driving circuit which receives a first value voltage at light-on starting, drives a voltage stepping up circuit and lights on a cold cathode tube with a stepped-up high voltage, thereafter receives a second value voltage, drives the voltage stepping up circuit and continues the lighting-on of the cold cathode tube with a lower stepped-up voltage than the former stepped-up high voltage: further comprises a charging circuit which charges a capacitor with a small current; an amplifier which receives the charge voltage of the capacitor and outputs a voltage signal depending on variation of the received charge voltage; a voltage generating circuit for generating the second value voltage which is adjustable from an exterior; and a switch circuit which receives the output voltage from the amplifier, applies the first value voltage to the driving circuit at the time of lighting-on start-up, further applies to the driving circuit a voltage signal which varies from the first value voltage toward the second value voltage in response to variation of the output voltage from the amplifier and switches the voltage signal to the second value voltage when the voltage value of the voltage signal comes close to the second value voltage beyond a predetermined value.

According to the present invention, since the slowly varying voltage obtained by charging the capacitor with a small current is applied to the driving circuit via the amplifier and the switch circuit and, when the varying output voltage comes close to the second value voltage beyond the predetermined value, the switch circuit switches the output voltage to the second value voltage, a high output voltage necessary for the lighting-on is generated at the voltage stepping-up circuit during the starting-up period, and thereafter the voltage stepping-up circuit is driven so as to generate gradually a low predetermined output voltage and to move to a lighting-on state at a low output voltage.

In this instance, the switching is not effected suddenly from the first value voltage to the second value voltage, but the output voltage is gradually varied up to a midway toward the second value voltage. Then the output voltage comes close to a predetermined voltage value at which almost no flickering occurs even if switching is effected, a sudden switching is effected. The gradually varying output voltage is only used up to the midway toward the second value voltage and a capacitor having a large capacity is not required. Further, since the voltage difference at the time of switching is small, a possible flickering of light-on condition of the cold cathode tube due to switching of the driving condition is suppressed.

As a result, flickering of the display screen of the liquid crystal display device at the time of starting-up thereof is prevented, moreover, since the current value of the charging circuit is set at a small value, a charge capacitor having a small capacity sufficiently meets the requirement. Thus, the liquid crystal back light illuminating device which is suitable for reducing the size of the device is realized.

DESCRIPTION OF THE PREFERRED EMBODIMENTS

Figure 1:
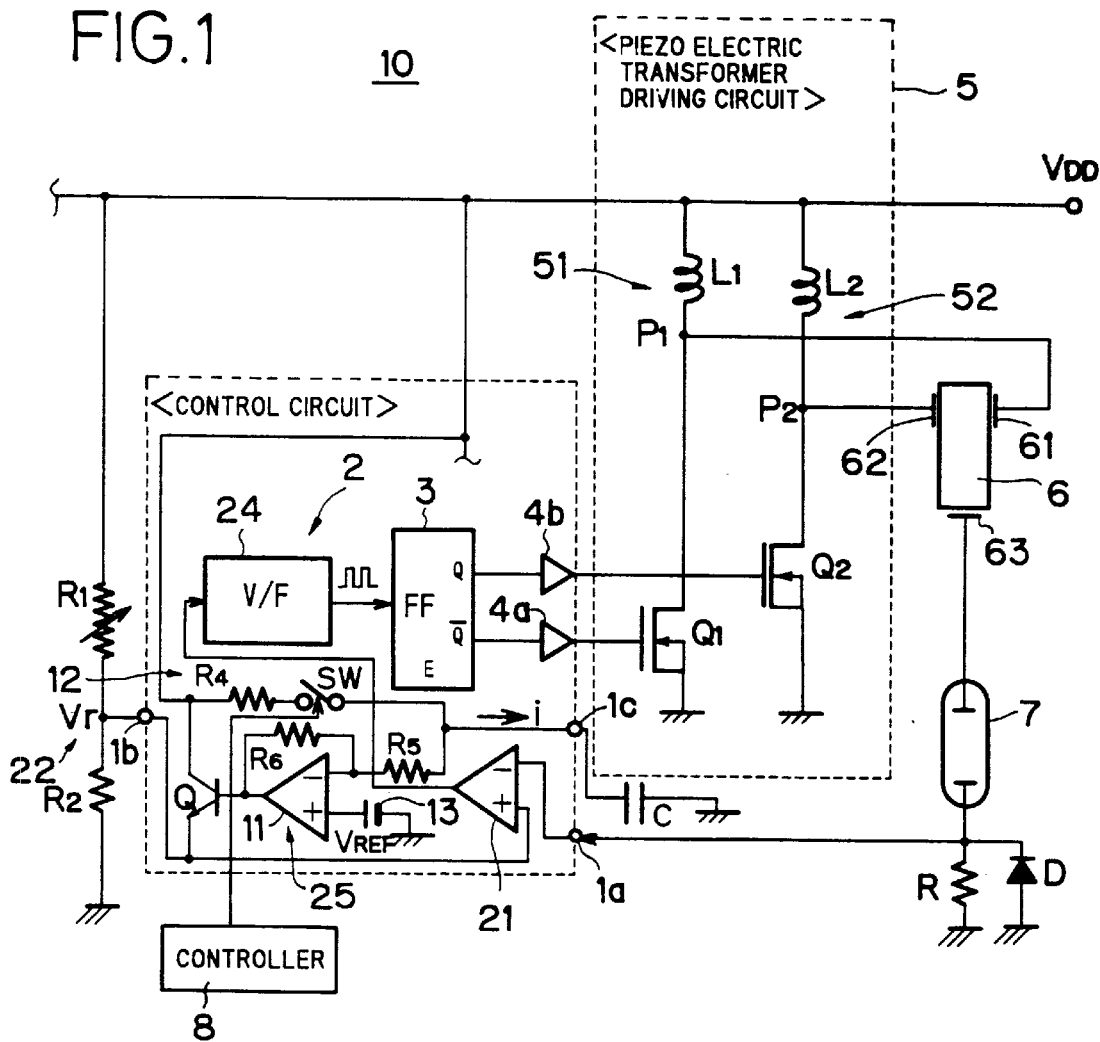
FIG. 1 is a block diagram of a cold cathode tube illuminating device in a liquid crystal display device representing one embodiment in which a liquid crystal back light illuminating device according to the present invention is applied.
Figure 5:
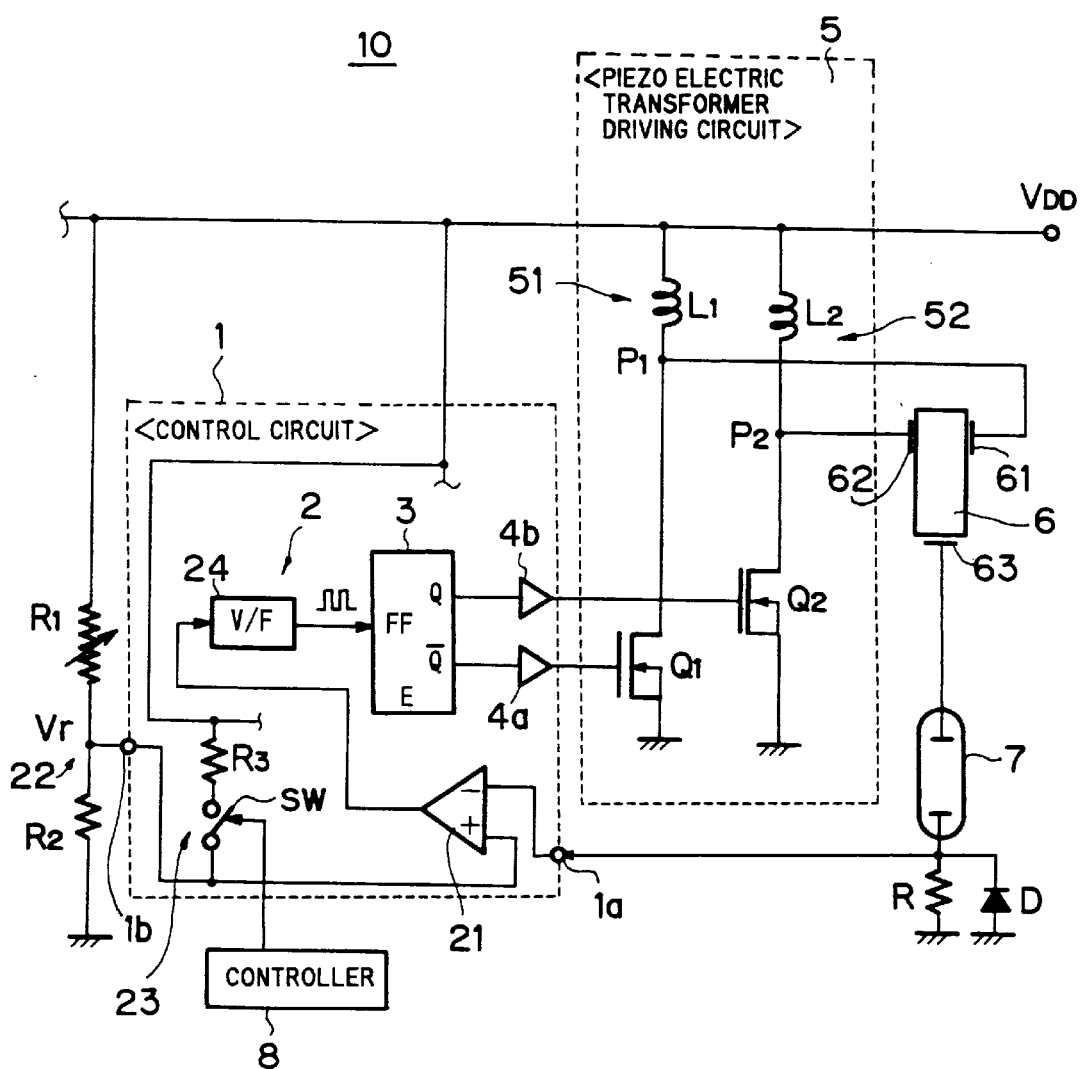

In FIG. 1, numeral 10 is a cold cathode tube illuminating device in a liquid crystal display device, of which difference from that in FIG. 5 is that a starter circuit 25 is provided in place of the starter circuit 23. Further, same or equivalent elements in FIG. 1 as those in FIG. 5 are designated by the same reference numerals and their explanation is omitted.

The starter circuit 25 is constituted by an inverting amplifier 11, an NPN type transistor Q, a charging circuit 12, a constant voltage generating circuit 13 and a capacitor C charged by the charging circuit 12. Herein, the transistor Q is a specific example of a switch circuit according to the present invention, and of which emitter is connected to a positive input (+input) of a differential amplifier 21 which also receives a reference voltage, of which collector is connected to the power source line $V_{DD}$ and of which base is connected to the output terminal of the inverting amplifier 11. Although the capacitor C is a part added externally to an IC represented by the control circuit 1 via a terminal 1c, the capacity thereof is small such as to be less than 1 $\mu$F. Terminals 1a, 1b and 1c are ones provided for the IC.

The inverting amplifier 11 receives a voltage $V_{REF}$ from the constant voltage generating circuit 13 at its positive input (+input) as a comparing voltage and receives a charging voltage from the capacitor C at its inverting input (−input) via a resistor R5. Accordingly, this inverting amplifier 11 forms an inverting type amplifier. Namely, in this circuit the voltage at the positive input (+input) is fixed and the voltage level at the inverting input (−input) varies. Further, the value of a feed back resistor R6 of the inverting amplifier 11 is selected to be equal to the value of a resistor R5 at the input side thereof, therefore, the amplification rate of the inverting amplifier 11 is one (1).

The charging circuit 12 is constituted by a series circuit of a resistor R4 and a switch SW connected between the power source line $V_{DD}$ and the terminal 1c. When the switch SW is turned ON, the capacitor C is charged with a small current i via the terminal 1c. After the switch SW is turned OFF, the electric charges in the capacitor C are discharged via the input resistor R5 and the inverting input (−input) of the inverting amplifier 11.

Herein, the switch SW is turned ON in response to a control signal from the controller 8. In the present embodiment, the switch SW is turned ON after the power source being applied to the liquid crystal display device or when the liquid crystal is lighted on and the ON condition of the switch SW is maintained by the control signal from the controller 8 until the liquid crystal is lighted off.

Figure 2:
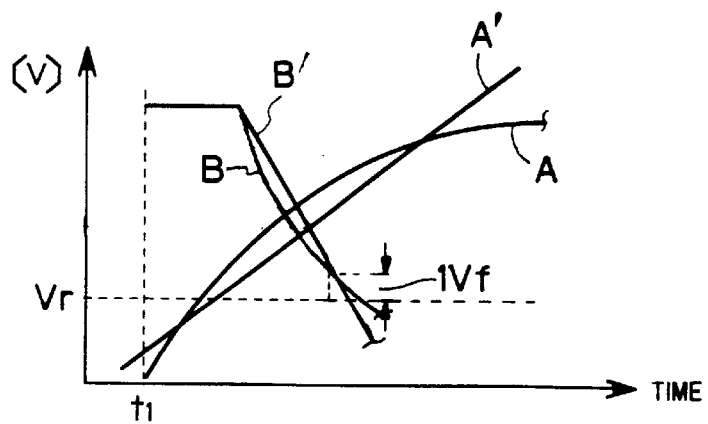
FIG. 2 is a waveform diagram showing an operation of the embodiment at the time of starting-up.

FIG. 2 shows a voltage variation at the positive input (+input) of the differential amplifier 21, when the switch SW is turned ON. The operation of the starter circuit 25 is explained with reference to FIG. 2.

When the switch SW is turned ON at time t1, the capacitor C begins to be charged with a small current i. Characteristic curve A in FIG. 2 illustrates this situation. The output voltage of the inverting amplifier 11 is a voltage obtained by inverting the voltage represented by the characteristic curve A. The output voltage is applied to the base of the transistor Q. Therefore, at first the transistor Q is turned ON and the voltage at the terminal 1b where the reference voltage Vr is generated forms the emitter voltage of the transistor Q. The emitter voltage corresponds to a value obtained by subtracting an ONsat (saturated condition) voltage between collector-emitter of the transistor Q from the power source line $V_{DD}$ voltage. Since the voltage at this moment at the terminal 1b is applied to the positive input (+input) of the differential amplifier 21, a constant high voltage is applied to the V/F converting circuit (V/F) 24 at the time of lighting-on starting, a high output voltage is generated at the piezo electric transformer driving circuit 5, and a large tube current flows through the cold cathode tube 7 lights-on the cold cathode tube 7. Thereafter, the voltage applied to the V/F converter circuit (V/F) 24 is gradually lowered toward the reference voltage Vr as shown by characteristic curve B in FIG. 2 and is finally set to the reference voltage Vr.

More specifically, at the starting time of charging the capacitor C the voltage at the positive input of the differential amplifier 21 assumes the constant voltage generated at the time t1 and a high output voltage corresponding to the ONsat (saturated condition) voltage between the collector-emitter of the transistor Q1 is at first generated from the differential amplifier 21. The voltage at the terminal 1b is maintained for a predetermined constant time interval from the start at a predetermined constant value (which corresponds to the constant voltage generated after the time t1 and is referred to as a first value voltage in the present invention). When a charged voltage of the capacitor C rises to some extent after a predetermined time, in response thereto the output voltage of the inverting amplifier 11 which represents the inverting voltage of the charged voltage decreases. The output voltage is applied to the base of the transistor Q.

When the base voltage of the transistor Q lowers to some extent in response to an increase of the charged voltage of the capacitor C, the transistor Q is put into a condition where the internal resistance thereof (resistance between collector-emitter) gradually varies and the emitter voltage of the transistor Q is gradually lowered depending on the base voltage as illustrated by characteristic curve B in FIG. 2. In the mean time the base voltage of the transistor Q reaches to a point where the base voltage is higher than the emitter voltage by 1 Vf (which corresponds to a forward voltage drop between base-emitter). When the base voltage further drops, the transistor Q is turned OFF. When the transistor Q is turned OFF, the voltage at the terminal 16 is placed out of control from the emitter voltage of the transistor Q, and at this moment the voltage at the terminal 1b is switched to the reference voltage Vr. Namely, the output voltage of the inverting amplifier 11 varies as illustrated by the solid line in FIG. 2, however the voltage at the terminal 1b suddenly assumes the reference voltage Vr at the moment when the base voltage reaches to a voltage higher than the reference voltage Vr by 1 VF as illustrated by the dotted line in FIG. 2.

Thereby, the voltage at the terminal 1b is maintained at Vr at the moment when the base voltage reaches to a voltage higher than the reference voltage Vr by 1 VF and the reference voltage Vr is applied to the positive input (+input) of the differential amplifier 21. As a result, a predetermined low output voltage (which corresponds to the reference voltage Vr) is generated at the piezo electric transformer driving circuit 5 after a predetermined time spanning from the lighting-on start to the moment when the base voltage of the transistor Q reaches to a voltage higher than the reference voltage Vr by 1 Vf, and the lighting-on of the cold cathode tube 7 is continued while flowing a small tube current therethrough.

In the above embodiment, the voltage shifting from the predetermined constant value (the first value voltage according to the present invention) at the time of starting-up to the reference voltage Vr is performed slowly in response to the variation of the charged voltage of the capacitor C and the final voltage at which a sudden change occurs is suppressed at 1 Vf where the transistor Q is turned OFF. The 1 Vf is a voltage value at which the switching is effected and corresponds to the predetermined value for the second value voltage according to the present invention as the voltage level which prevents flickering.

Namely, at the point higher than the reference voltage Vr by 1 Vf, the transistor Q is turned OFF and the voltage at the positive input (+input) of the differential amplifier 21 is set at the reference voltage level Vr. Until that instant, the voltage changes gradually so that no flickering of course occurs. After the differential amplifier 21 is set at the reference voltage level Vr, the differential amplifier 21 controls the V/F converter 24 as explained in connection with the conventional art so as to generate a constant frequency signal which is produced when the voltage across the resistor R representing the discharge current value flowing through the cold cathode tube 7 during the light-on period coincides with the reference voltage Vr, and the piezo electric transformer driving circuit 5 is driven with this constant frequency signal.

In the present embodiment, the shifting operation from the high voltage at the light-on starting-up to the predetermined low reference voltage Vr is determined by the inclination characteristic of the characteristic curve A which is again determined by the capacitance of the capacitor C and the current value i of the charging circuit 12. Since the current value i can be reduced by adjusting the resistance value of the resistor R4, the capacitance of the capacitor C can be reduced correspondingly.

A capacitor C having a capacitance less than 1 $\mu$F is sufficient for obtaining a display screen of which no flickering is felt at the time of starting-up. Since a power source voltage of electronic equipments is about a few volts, a low withstanding voltage of the capacitor having a capacity less than 1 $\mu$F is satisfactory, therefore the size thereof can be extremely reduced.

Figure 3:
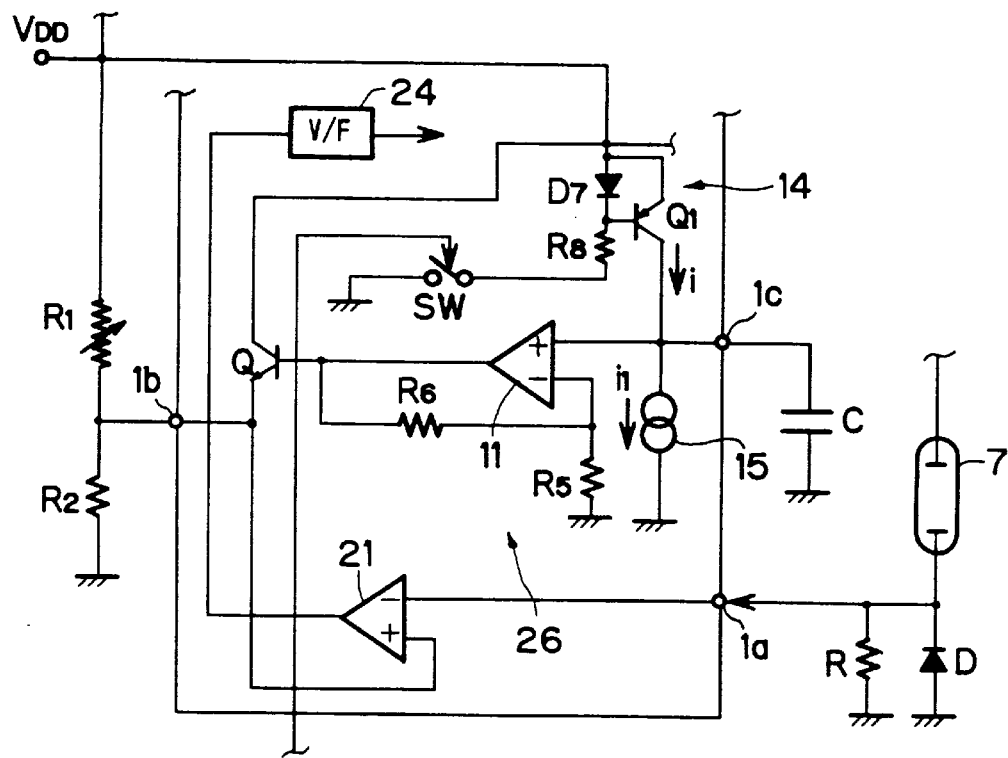
FIG. 3 is a specific circuit diagram of a starter circuit in another embodiment in which a liquid crystal back light illuminating device according to the present invention is applied.

FIG. 3 is a specific example of a starter circuit in which the charging current value for the capacitor C is set at a further reduced value, the charging is performed with a constant current and the switching operation is performed further slowly.

A starter circuit 26 is provided in place of the starter circuit 25 shown in FIG. 1, wherein a constant current source 14 of a constant current i is provided in place of the charging circuit 12 and at the downstream of the constant current source 14 another constant current source 15 is provided. The juncture of the two constant current sources 14 and 15 is connected of the terminal 1c to charge the capacitor C.

In the present embodiment, the constant current source 14 is constituted by a PNP type transistor Q1 using a diode D7 and a resistor R8 as the base biasing resistor therefor, the emitter of the transistor Q1 is connected to the power source line $V_{DD}$ and the collector thereof is connected to the terminal 1c. Further, the diode D7 is provided between the power source line $V_{DD}$ and the base of the transistor Q1, and the base of the transistor Q1 is grounded via the resistor R8 and a switch SW.

Further, in the present embodiment the inverting amplifier 11 is provided with resistors R5 and R6 at its inverting input (-input) and the inverting input is grounded via the resistor R5. Accordingly, the positive input (+input) thereof is directly connected to the terminal 1c.

Namely, with the provision of the two constant current sources the charging current I for the capacitor C is defined as I=i-il, wherein i>il.

Thereby, the charging characteristic of the capacitor C takes a straight inclination as illustrated by a graph A' in FIG. 2, and the base voltage for the transistor Q shifts along the graph B', which is obtained by inverting the inclination of the graph A', from a high voltage at the time of light-on starting-up toward the predetermined low reference voltage Vr.

Figure 4:
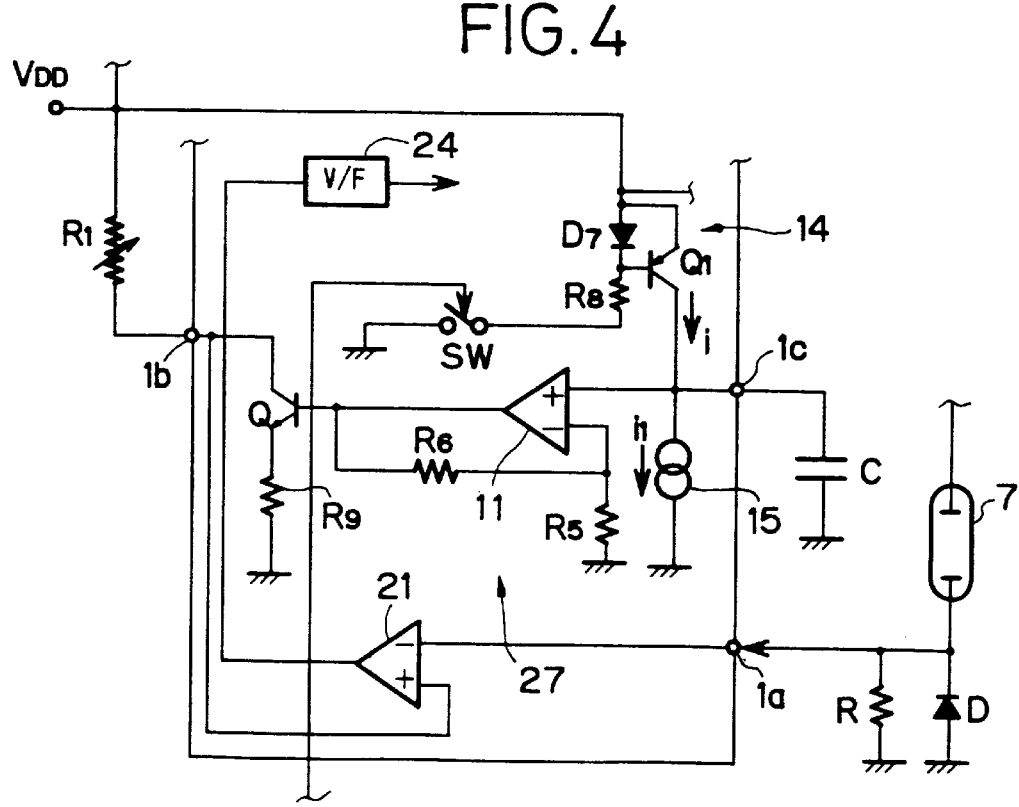
FIG. 4 is another specific circuit diagram of a starter circuit in still another embodiment in which a liquid crystal back light illuminating device according to the present invention is applied; and, FIG. 5 is a block diagram of a conventional cold cathode tube illuminating device using a piezo electric transformer driving circuit.

FIG. 4 shows still another embodiment wherein the resistor R2 in the FIG. 3 embodiment is built-in in an IC as a resistor R9.

In the above explained embodiments, piezo electric voltage stepping up circuits using a piezo electric transformer are exemplified. However, the present invention is also applicable for liquid crystal back light illuminating devices using other voltage stepping up circuit.

We claim:

1. A liquid crystal back light illuminating device comprising a driving circuit which receives a first value voltage at light-on starting-up, drives a voltage stepping up circuit and lights on a cold cathode tube with a stepped-up high voltage, thereafter receives a second value voltage, drives the voltage stepping up circuit and continues lighting-on of the cold cathode tube with a lower stepped-up voltage than the former stepped-up high voltage, further comprising:

a charging circuit which charges a capacitor with a small current;

an amplifier which receives the charge voltage of the capacitor and outputs a voltage signal in response to variation of the received charge voltage;

a voltage generating circuit for generating the second value voltage which is adjustable and, a switch circuit which receives the output voltage from said amplifier, applies the first value voltage to said driving circuit at the time of light-on starting-up, further applies to said driving circuit a voltage signal which varies from the first value voltage toward the second value voltage in response to variation of the output voltage from said amplifier and switches the voltage signal to the second value voltage when the voltage value of the voltage signal comes close to the second value voltage beyond a predetermined value.

2. A liquid crystal back light illuminating device according to claim 1, wherein the predetermined value is a voltage value with which no flickering occurs of lighting-on condition of the cold cathode tube, the first value voltage is larger than the second value voltage, said amplifier is an inverting amplifier having amplification rate of substantially one, said charging circuit, said amplifier, said driving circuit and said switch circuit are integrally formed into one IC, and the capacitor is externally added to said IC.

3. A liquid crystal back light illuminating device according to claim 2, wherein the current value of the small charging current is at a level which permits the capacitor having a capacitance less than 1 $\mu$F and said driving circuit outputs a driving signal having a frequency in response to the respective voltage values of the first value voltage and the second value voltage to said voltage stepping-up circuit.

4. A liquid crystal back light illuminating device according to claim 3, wherein said driving circuit includes a differential amplifier having an input terminal and a voltage/frequency converting circuit which receives an output of said differential amplifier and generates the driving signal, said voltage generating circuit is a divider circuit formed by connecting a variable resistor and a resistor in series, generates a divided voltage as the second value voltage and inputs the same to the input terminal of said differential amplifier and said switch circuit is constituted by a transistor of which emitter is connected to the input terminal of said voltage generating circuit and of which base receives the output of said differential amplifier.

5. A liquid crystal back light illuminating device according to claim 4, wherein said voltage stepping-up circuit is a series circuit of a coil and a switching transistor inserted between a power source line and the ground, the driving signal is a pulse signal for switching said switching transistor and said predetermined value is 1 Vf (a base—emitter forward voltage drop of said transistor).

6. A liquid crystal back light illuminating device according to claim 5, wherein said voltage stepping-up circuit includes two sets of the series circuit, said driving circuit further includes a flip-flop circuit which receives the output of said voltage/frequency converting circuit, and a Q output and an inverted Q output of said flip-flop circuit form the pulse signal for switching the switching transistor of said respective series circuits.

7. A liquid crystal back light illuminating device according to claim 3, wherein said charging circuit includes a first constant current source provided between a power source line and a juncture terminal to which the capacitor is connected and a second constant current source provided between the juncture terminal and the ground.

8. A liquid crystal display device comprising a driving circuit which receives a first value voltage at light-on starting, drives a voltage stepping up circuit and lights on a cold cathode tube with a stepped-up high voltage, thereafter receives a second value voltage, drives the voltage stepping up circuit and continues lighting-on of the cold cathode tube with a lower stepped-up voltage than the former stepped-up high voltage, further comprising:

a charging circuit which charges a capacitor with a small current;

an amplifier which receives the charge voltage of the capacitor and outputs a voltage signal in response to variation of the received charge voltage;

a voltage generating circuit for generating the second value voltage which is adjustable; and, a switch circuit which receives the output voltage from said amplifier, applies the first value voltage to said driving circuit at the time of light-on starting-up, further applies to said driving circuit a voltage signal which varies from the first value voltage toward the second value voltage in response to variation of the output voltage from said amplifier and switches the voltage signal to the second value voltage when the voltage value of the voltage signal comes close to the second value voltage beyond a predetermined value.

9. A liquid crystal display device according to claim 8, wherein the predetermined value is a voltage value with which no flickering occurs of lighting-on condition of the cold cathode tube, the first value voltage is larger than the second value voltage, said amplifier is an inverting amplifier having amplification rate of substantially one, said charging circuit, said amplifier, said driving circuit and said switch circuit are integrally formed into one IC, and the capacitor is externally added to said IC.

10. A liquid crystal display device according to claim 9, wherein the current value of the small charging current is at a level which permits the capacitor having a capacitance less than 1 $\mu$F and said driving circuit and outputs a driving signal having a frequency in response to the respective voltage values of the first value voltage and the second value voltage to said voltage stepping-up circuit.

* * * * *